July 12, 1960

M. BERZ 2,944,744

RING AND ROLLER PULVERIZING APPARATUS

Filed Aug. 2, 1957

INVENTOR
MAX BERZ
BY
ATTORNEY

July 12, 1960  M. BERZ  2,944,744
RING AND ROLLER PULVERIZING APPARATUS
Filed Aug. 2, 1957  4 Sheets-Sheet 2

INVENTOR
MAX BERZ
BY
E. Francis Wentworth Jr.
ATTORNEY

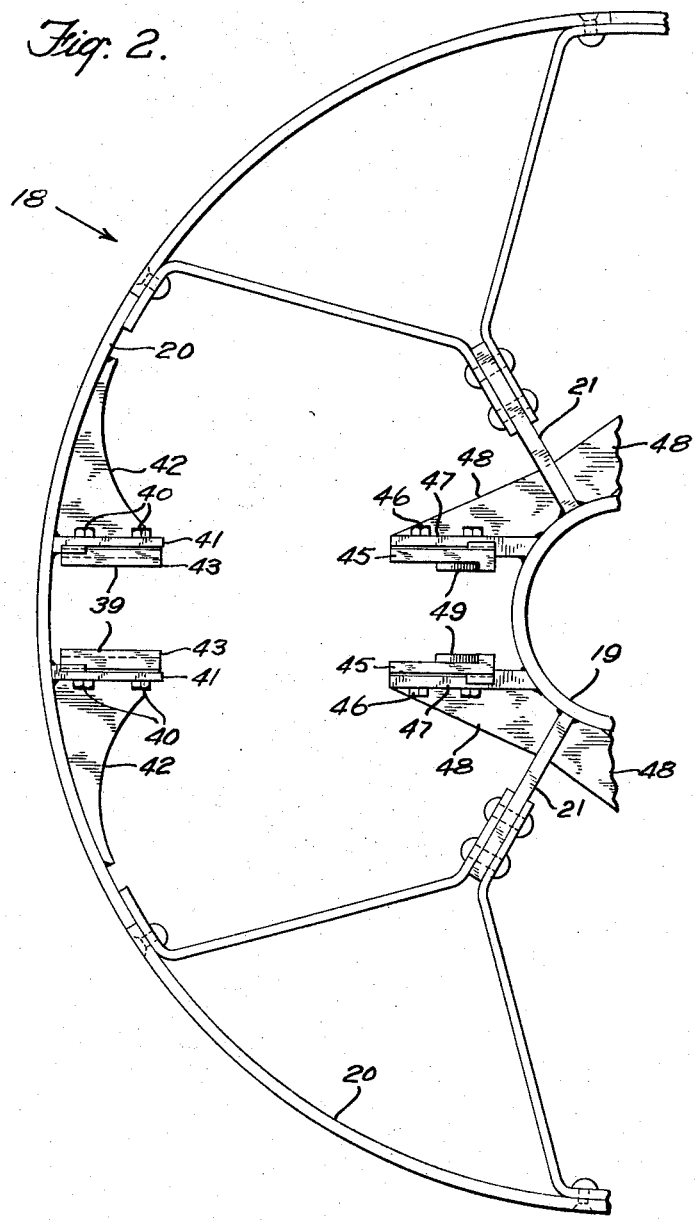

July 12, 1960

M. BERZ 2,944,744

RING AND ROLLER PULVERIZING APPARATUS

Filed Aug. 2, 1957

INVENTOR
MAX BERZ
BY
ATTORNEY

`United States Patent Office`

2,944,744
Patented July 12, 1960

2,944,744

RING AND ROLLER PULVERIZING APPARATUS

Max Berz, Bayerlandstrasse 23, Kochel am See, Germany

Filed Aug. 2, 1957, Ser. No. 675,847

3 Claims. (Cl. 241—132)

This invention relates to pulverizing apparatus and more particularly ring and roller pulverizing apparatus wherein material, such as coal and the like, is crushed and pulverized by action of the rings and rollers.

This application is a continuation-in-part application of United States patent application Serial No. 515,404, filed June 14, 1955.

An object of the present invention is to provide a ring and roller pulverizer requiring less power input than presently known ring and roller pulverizers of comparable capacity.

Another object is to provide a pulverizer wherein the rings and rollers are constructed and assembled so as to provide a self-centering assembly and in which assembly there are no friction surfaces subject to wear, except the grinding surfaces thereof.

Accordingly, the present invention provides a grinding ring supported and carried by a base or table within a casing. The table is rotatably mounted and drivably connected to a source of rotary power. In the upper surface of the grinding ring is formed an annular recess or track adapted to receive a plurality of pressure rollers, and the roller surfaces and the track are provided with complementary contacting surfaces. Each roller is rotatably mounted in a roller race member which comprises two concentric rings and each ring has means adapted to rotatably support the end portions of each roller shaft and permit limited vertical movement of the rollers with respect to the roller race member. A plurality of compression springs are disposed between a pressure ring, which engages the rollers, and a thrust ring to provide a yieldable connection between the pressure and thrust rings, and to exert downward pressure on each roller. The pressure and thrust rings are mounted in the casing so as to be fixed against rotation and at the same time allow the vertical displacement of the rings with respect to the grinding table as the rollers planetate in the track of the table.

Other features and advantages will become apparent from the following description considered in connection with the accompanying drawings forming a part thereof and in which:

Fig. 2 is an enlarged fragmentary plan view of the roller race member;

Figure 1:
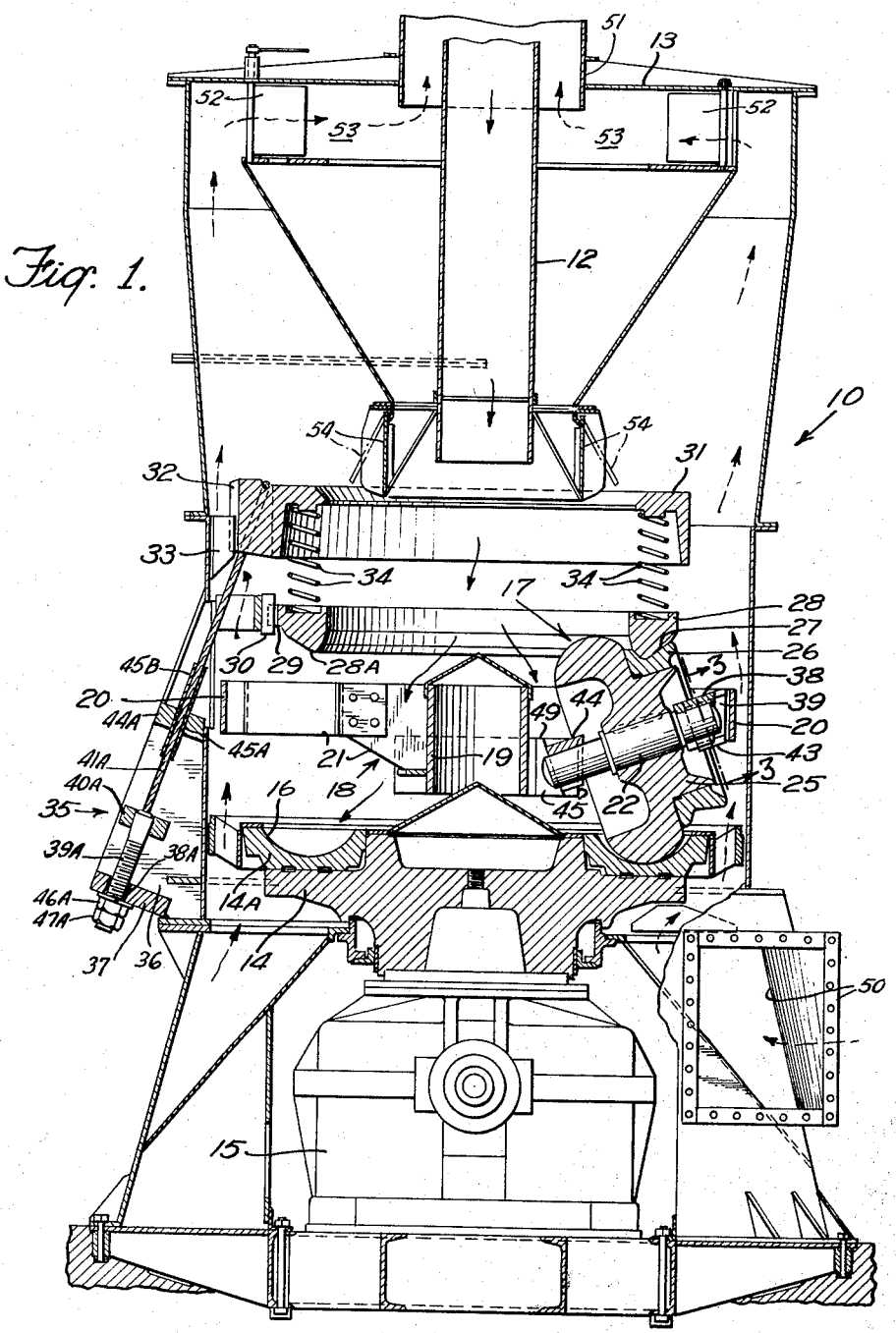
Fig. 1 is a sectional view, in elevation, of the pulverizer according to this invention.

Referring to the drawings, and more specifically to Fig. 1, 10 designates a casing having a feed tube 12 extending downwardly from the top wall 13 of the casing and along the longitudinal axis thereof. A table 14 is horizontally supported in the bottom portion of casing 10 and in spaced relationship with feed tube 12. Table 14 is rotatably driven about its vertical axis by a suitable means, such as a motor 15. A grinding ring 14A is rotatably carried on the upper surface of the table 14. In the upper surface of grinding ring 14A is formed a concave annular grinding recess or track 16.

A plurality of spaced pressure rollers 17 ride in track 16 only one of which rollers, for purposes of clarity, is shown in the drawing. Each roller 17 is rotatably supported in a roller race member 18, best shown in Fig. 2, which member comprises an inner and outer guide ring 19 and 20, respectively. Rings 19 and 20 are concentrically arranged in slightly different horizontal planes and are connected together by a plurality of radially spaced spokes 21 (Fig. 2). Each roller 17 has a shaft 22, the end portions of which are supported by the inner and outer guide rings 19 and 20. Each roller 17 has a hub portion 25 to which is press fit, or otherwise suitably secured, a bearing collar 26. Collar 26 is provided with a peripheral groove 27 which engages a complementary shaped surface 28A of a pressure ring 28. The surfaces of the rollers and the track may be of any suitable shape; however, it is preferable to provide a track of part-circular or arcuate cross-section and the surfaces of the rollers toroidal.

Figure 1A:
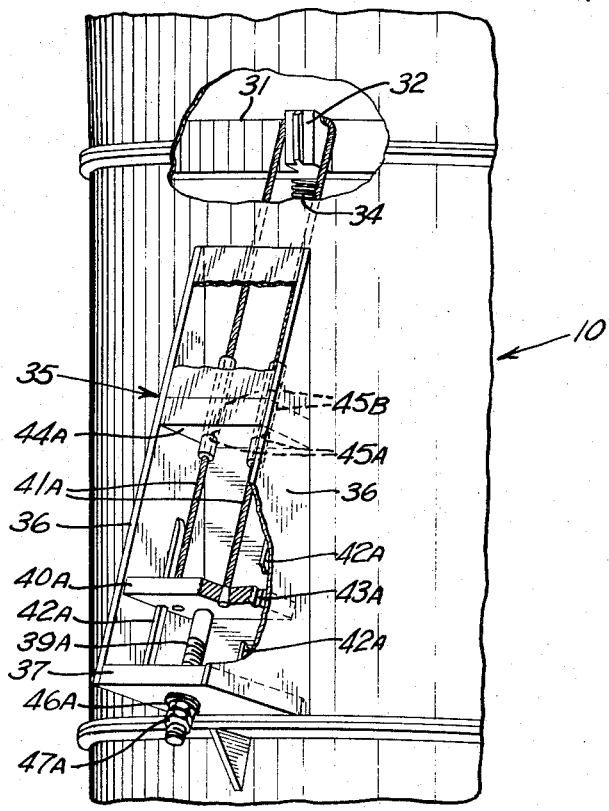
Fig. 1A is an enlarged fragmentary view, in elevation, of the hold-down assembly shown in Fig. 1.

Pressure ring 28 has a plurality of spaced slotted lugs 29 in the outer periphery thereof into which project tongues 30. Tongues 30 are secured to casing 10 and extend inwardly therefrom into slotted lugs 29 to prevent rotation of ring 28 and to guide the latter in its vertical movement. Spaced from and above ring 28 is a thrust ring 31 which has a plurality of spaced tongues 32 extending from its periphery, which tongues project into a plurality of slotted lugs 33 which are mounted on and extend inwardly from casing 10. As lugs 29 and tongues 30 cooperate to vertically guide and prevent rotation of rings 28, similarly tongues 32 and lugs 33 cooperate to prevent rotation of ring 31 and to guide the latter in its vertical movement. Interposed between the pressure and thrust rings 28 and 31 are a plurality of spaced compression springs 34 which maintain rings 28 and 31 in spaced relationship and provide a downward thrust or biasing force upon each of the rollers 17 through pressure ring 28. The compression of springs 34 or biasing force exerted by said springs is adjustable by means of a plurality of thrust ring hold-down assemblies 35 (Fig. 1) secured to casing 10, only one of which assemblies is shown. Thrust ring hold-down assemblies 35, as best shown in Fig. 1A, comprise a housing having spaced parallel side walls 36 which are secured, as by welding, to casing 10. A base plate 37 having a central aperture 38A therein, is secured to casing 10 and to the lower ends of walls 36. A threaded stud 39A extends through aperture 38A into the housing and is connected to an anchor plate 40A which anchor plate is disposed between side walls 36 of the housing. A flexible tie-rod member 41A, such as a woven-wire cable, is secured at one end to anchor plate 40A and extends at an angle upwardly into casing 10 and over the top of tongue 32 of thrust ring 31 and downwardly to anchor plate 40A where the other end of the tie-rod member 41A is secured within the anchor plate. A guide rail 42A is provided on the inner surface of each side wall 36, which guide rails are adapted to engage grooves 43A in the opposite sides of anchor plate 40A. Adjacent the upper end of the housing, a guide plate 44A is secured between side walls 36 and to casing 10. Plate 44A is provided with two spaced holes 45A in which are secured sealing tubes 45B. The sealing tubes 45B are adapted to receive therethrough the legs of tie-rod member 41A. An adjusting nut 46A is threaded on the lower end of stud 39A and is held in a selected position by a lock nut 47A. By loosening lock nut 47A and rotating nut 46A on stud 39A, stud 39A is drawn downwardly or moved upwardly depending upon the direction of rotation of nut 46A. Since anchor plate 40A is secured to stud 39A, anchor plate 40A is slid upwardly or downwardly along guide rails 42A. By rotating nut 46A on stud 39A in a direction so that stud 39A is moved downwardly, tie-rod member 41A is pulled downwardly by anchor plate 40A thereby drawing thrust ring 31 closer to pressure ring 28 and increasing the compression of springs 34. Conversely, rotating nut 46A in a direction so that stud 39A is allowed, under the urging of springs 34, to move upwardly, thrust ring 31 is permitted to move away from pressure ring 28 thereby lessening the compression of springs 34. After the desired adjustment is made, lock nut 47A is tightened against nut 46A to prevent rotation of the latter. By adjustment of the hold-down assemblies 35 in this manner, the crushing thrust upon rollers 17 is adjustable. By reason of the vertical displacement of the inner and outer rings 19 and 20, the roller shaft 22 is supported at an angle to a horizontal plane which permits the crushing force or thrust to be exerted upon the rollers directly above the deepest part of grinding track 16.

Since rollers 17 support roller race member 18 and pressure ring 28, the crushing force of the rollers includes the combined weight of each of the aforesaid members in addition to the downward force exerted by compression springs 34. This crushing thrust is increased whenever rollers 17 are force upwardly by the material coming between the rollers and track surfaces, which upward movement compresses, through pressure ring 28, springs 34.

Figure 3:
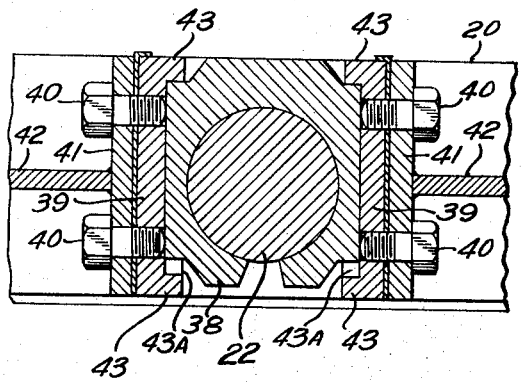
Fig. 3 is an enlarged view, in section, taken on line 3—3 of Fig. 1.

The means by which pressure rollers 17 are rotatably mounted to the roller race member 18 are best shown in Fig. 3. Shaft 22 of roller 17 carries on its outer end portion a bearing block 38 which is receivable between two spaced guide strips 39. Each strip 39 is secured by means of bolts 40 to plates 41 which slope downwardly at the same angle as the longitudinal axis of shaft 22 (Fig. 1). Plates 41 are in turn secured by welding or other suitable means to the inner peripheral surface of outer ring 20, and to a re-enforcing rib 42 (Figs. 2 and 3) disposed normal to said plates, and which re-enforcing ribs are secured to outer ring 20. The lateral surfaces of block 38 abut the inner surfaces of strips 39 and each strip 39 is provided along its top and bottom edges with inwardly projecting flanges 43. Block 38 is so formed that spaces 43A are provided between the bottom surface of the block 38 and flanges 43 to permit vertical movement between guide strips 39 and block 38, which vertical movement is limited by flanges 43.

Shaft 22 carries at its inner end portion a second bearing block 44 which is receivable between two spaced guide strips 45 (Fig. 1) and the latter are suitably secured, as by bolts 46, to plates 47 (Fig. 2). Plates 47 are secured to the outer peripheral surface of inner ring 19 and project outwardly thereof. Plates 47 are re-enforced by rib members 48 secured normal to said plates and to the outer peripheral surface of inner ring 19. Each strip 45 is provided with shoulders 49 along the inner vertical edge against which block 44 abuts.

Figure 4:
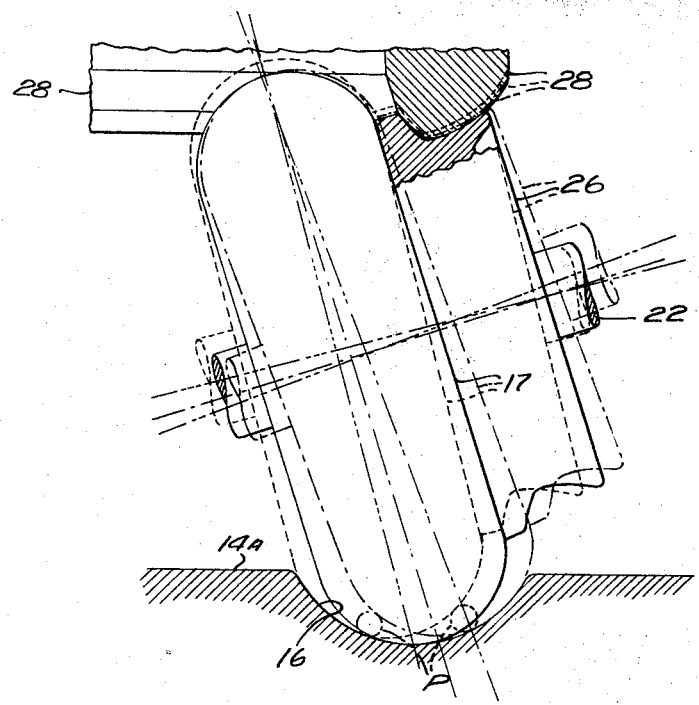
Fig. 4 is a somewhat diagrammatic representation of a roller and the grinding track according to this invention showing the movement of the rollers under the urging of material to be pulverized.

In providing relative movement between strips 39 and block 38, vertical movement of race member 18 with respect to rollers 17 is provided, which movement insures engagement of all the rollers with track 16 and the material to be pulverized under all normal operating conditions. For example, in the event there is uneven distribution of material to be pulverized in track 16 or one roller encounters material which will not readily disintegrate, the roller which encounters that material will ride upwardly lifting race member 18; when this occurs the other rollers are not lifted out of engagement with track 16 and the material to be pulverized by reason of the relative movement provided between the race member and the rollers. In addition, rollers 17 will not only move vertically parallel to the axis of rotation of grinding table 14 under the urging of material to be pulverized, but are also free to move within track 16 toward and away from the axis of rotation of grinding table 14 under the urging of the material to be pulverized. As illustrated in Fig. 4, if a particle P of material to be pulverized which resists crushing lies in track 16 to the right of a vertical line drawn from pressure ring 28, roller 17 will be urged toward the axis of rotation of table 14 as shown by the dotted line. If a particle P of material to be pulverized which resists crushing lies in track 16 to the left of a vertical line extending downwardly from pressure ring 28, roller 17 will be urged away from the axis of rotation of table 14, as shown by the dot-dash line. This movement of each of the rollers 17 is achieved because the opposite ends of shafts 22 of each of the rollers is supported by bearing blocks 38 and 44 which are free to move vertically relative to each other within the respective pairs of guide strips 39 and 45, and since pressure ring 28 is free to move vertically and laterally with respect to the roller race member 18.

Since pressure ring 28 and thrust ring 31 are mounted so as to permit vertical movement thereof with respect to the grinding ring table 14, and the rollers 17 are mounted to provide vertical movement of the latter with respect to roller race member 18, sufficient yieldability is provided in the assembly to prevent damage to the component parts thereof during the grinding operation. Furthermore, since the rollers support the pressure and thrust rings and roller race member 18 and since the surfaces of the rollers and the track have complementary shapes, a self-centering assembly is provided.

In the operation of the pulverizer of the present invention, table 14 which carries grinding ring 14A is rotated by motor 15. Material to be pulverized, such as coal, cement clinkers or the like, is introduced into casing 10 through feed tube 12. The material is discharged from feed tube 12 and falls through thrust ring 31, pressure ring 28 and roller race member 18 onto the upper surface of table 14 and into grinding track 16 as shown by the solid arrows in Fig. 1. As grinding ring 14A rotates, it causes rollers 18 to revolve about the axis of table 14 and the pressure exerted on rollers 18 by the weight of rings 28 and 31 and by springs 34 through pressure ring 28, causes the rollers to rotate about their own axes. Rollers 18 thus planetate around the axis of grinding table 14 and exert powerful crushing action on the material to be pulverized which lies on track 16. The interior of casing 10 is provided with one or more air inlet ducts 50 (only one being shown in Fig. 1) disposed in the lower part of casing 10. An outlet opening 51 is provided at the top of casing 10, which outlet communicates with an exhaust fan (not shown). As shown by the broken arrows in Fig. 1, air is drawn into the interior of casing 10 through inlet duct 50 and upwardly past the peripheral edge of table 14. As the air passes upwardly past table 14 and grinding ring 14A, the air entrains finely ground material and carries the particles upwardly past the outer periphery of rings 28 and 31 to the top of casing 10. Thereafter, the air and entrained particles pass adjustable vanes 52 into a classifying chamber 53 where particles of undesirable size separate from the air stream and are returned to grinding ring 14A upon the opening of flap valves 54. From classifying chamber 53 the air and the remaining entrained particles pass through outlet 51 to a point of use or storage (not shown).

It is readily apparent from the foregoing description that a pulverizer has been provided in which the grinding elements, grinding ring 14A, rollers 17, rings 28 and 31 coact and are so constructed to provide a self-centering assembly. Furthermore, the pulverizer according to this invention requires less power input than other ring and roller pulverizers of comparable capacity. The novel mounting of the rollers and suspension of pressure and thrust rings, provide sufficient yieldability between the component parts to prevent damage due to sudden strain and stresses.

What is claimed is:

1. Pulverizing apparatus comprising a casing, a plate mounted for rotation and having a grinding surface portion, means for rotating said plate, means for introducing material to be pulverized into said casing and onto said plate and said grinding surface portion, a plurality of rollers, each roller having a peripheral grinding face adapted for contact with said grinding surface portion, support means for supporting each roller for conjoined rotation about their respective axes, said support means being carried by said rollers, the faces of said rollers and the grinding surface portion of said plate being shaped and proportioned to urge the faces of the rollers to constantly follow a predetermined path of contact on the grinding face portion, a first ring member disposed above said rollers and adapted to engage said rollers, a second ring member spaced from said first ring member and adapted to slidably engage said casing so that said second ring member is movable relative to said first ring member, expansible and contractible means disposed between said first and second rings, a plurality of hold-down assemblies arranged in spaced relationship to each other, each of said hold-down assemblies comprising a flexible cable, a plate slidably connected to the casing at a point below said second ring member, the cable being connected to said plate and to said second ring member, means for sliding said plate in a direction toward and away from said second ring member so that said second ring member is moved in relationship with the first ring member to thereby provide a predetermined biasing force on said rollers.

2. The apparatus of claim 1 wherein the flexible cable is U-shaped and the ends of the cable are anchored in the plate with the looped end portion of the cable engaging said second ring member.

3. Pulverizing apparatus of the class described, comprising a horizontally disposed grinding plate mounted for rotation and having an annular grinding surface provided with an arcuate depression, means for rotating the grinding plate, means for introducing material to be pulverized into said casing and in said arcuate depression, a roller race member disposed above and in spaced relationship with the grinding plate, the roller race member having interconnected concentric inner and outer rings spaced from each other and lying in different horizontal planes, three pairs of peripherally spaced guide strips secured to the inner and outer rings, each pair of guide strips of the inner and outer guide strips extend radially from their respective rings and toward the pair of guide strips on the other ring, three grinding rollers having a peripheral and arcuate grinding face adapted for movement within the arcuate depression and in contact therewith, the arcuate face of each of the rollers having a radius of curvature less than that of the arcuate depression to provide contact of said grinding face with the deepest portion of the arcuate depression, each grinding roller having a shaft, a bearing block disposed on the opposite end portions of each of the roller shafts, each bearing block being receivable between a pair of guide strips on the inner ring and a pair of guide strips on the outer ring whereby the roller race is supported by the rollers, the bearing blocks and guide strips being constructed to permit vertical movement of the opposite ends of each of the roller shafts relative to each other so that the arcuate faces of the rollers move within the arcuate depression vertically and toward and away from the axis of rotation of the grinding plate under the urging of material to be pulverized, each pair of guide strips on the inner ring having flanged opposite edge portions extending over opposite edge portions of the bearing block disposed therebetween and spaced from the latter to limit vertical movement of the bearing block and roller shaft relative to the roller race member, means for exerting a biasing force on said rollers to urge the rollers in engagement with the arcuate depression.

References Cited in the file of this patent

UNITED STATES PATENTS

| 1,154,532 | Moss | Sept. 21, 1915 |
| 2,389,844 | Ebersole | Nov. 27, 1945 |

FOREIGN PATENTS

| 201,726 | Australia | May 10, 1956 |
| 672,009 | Great Britain | May 14, 1952 |